July 12, 1955
E. M. GREER ET AL
2,712,756
STATIC AND DYNAMIC TESTING MACHINE
Filed May 29, 1951
5 Sheets-Sheet 1
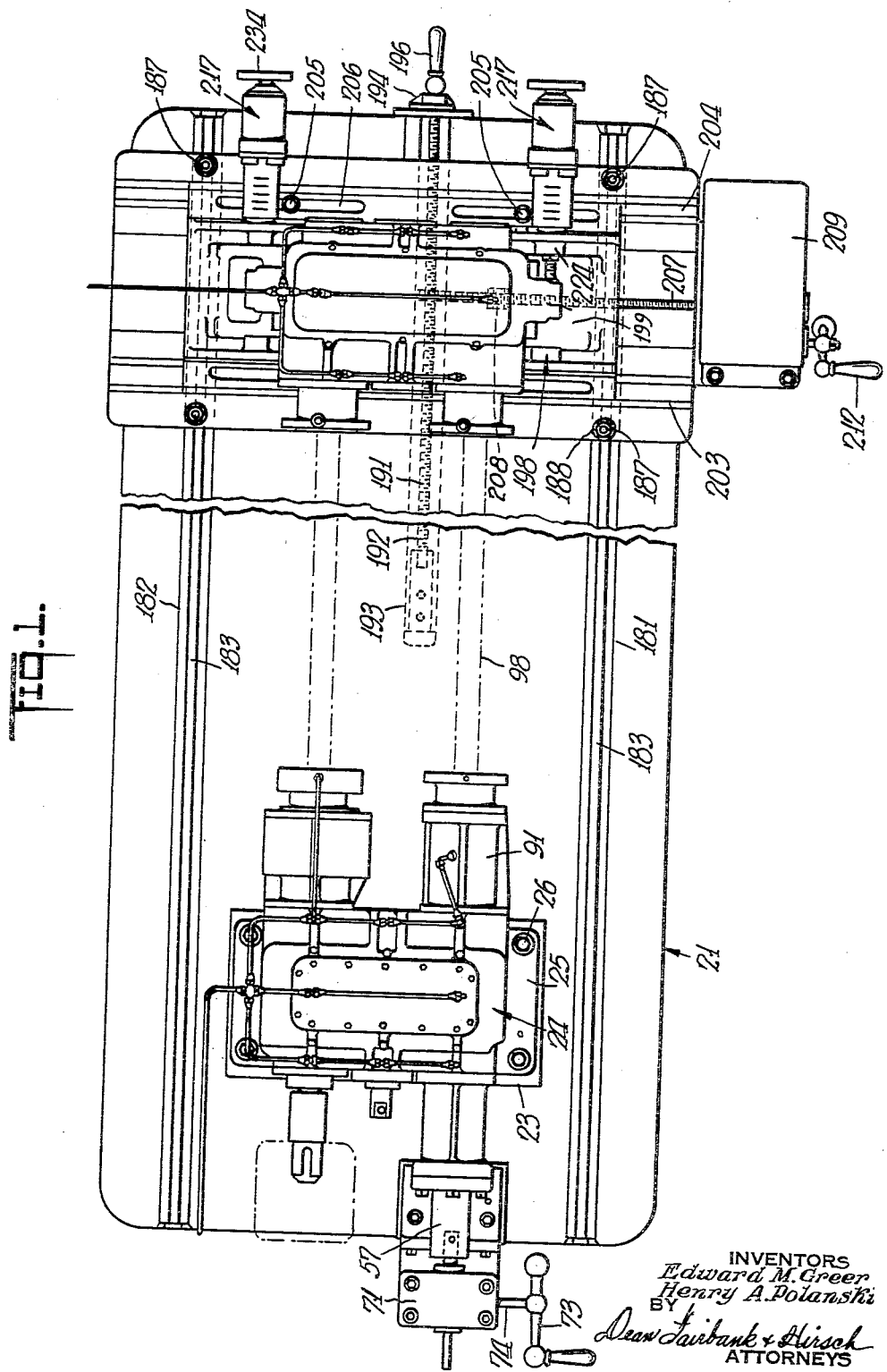
INVENTORS
Edward M. Greer
Henry A. Polanski
BY
Dean Fairbank & Hirsch
ATTORNEYS

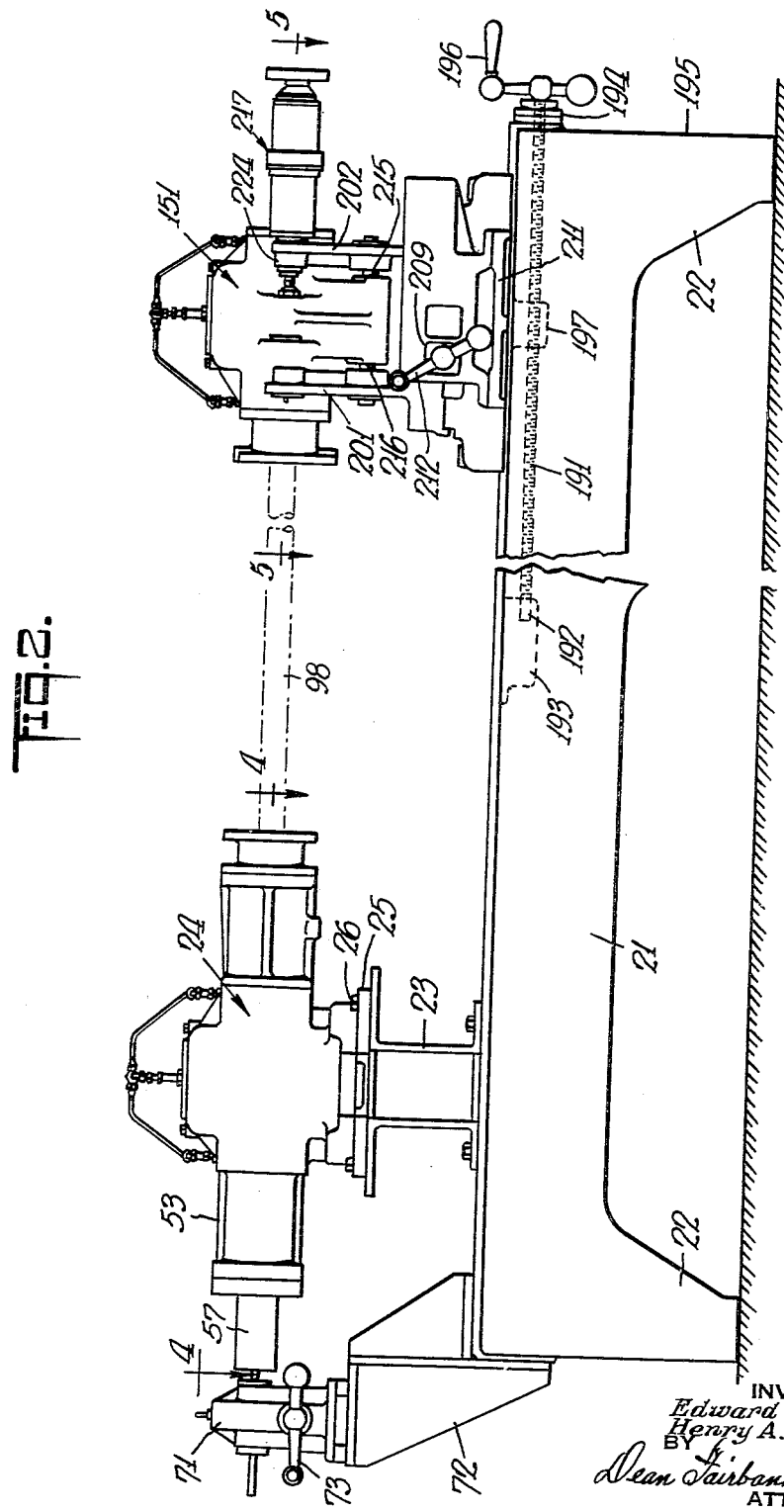

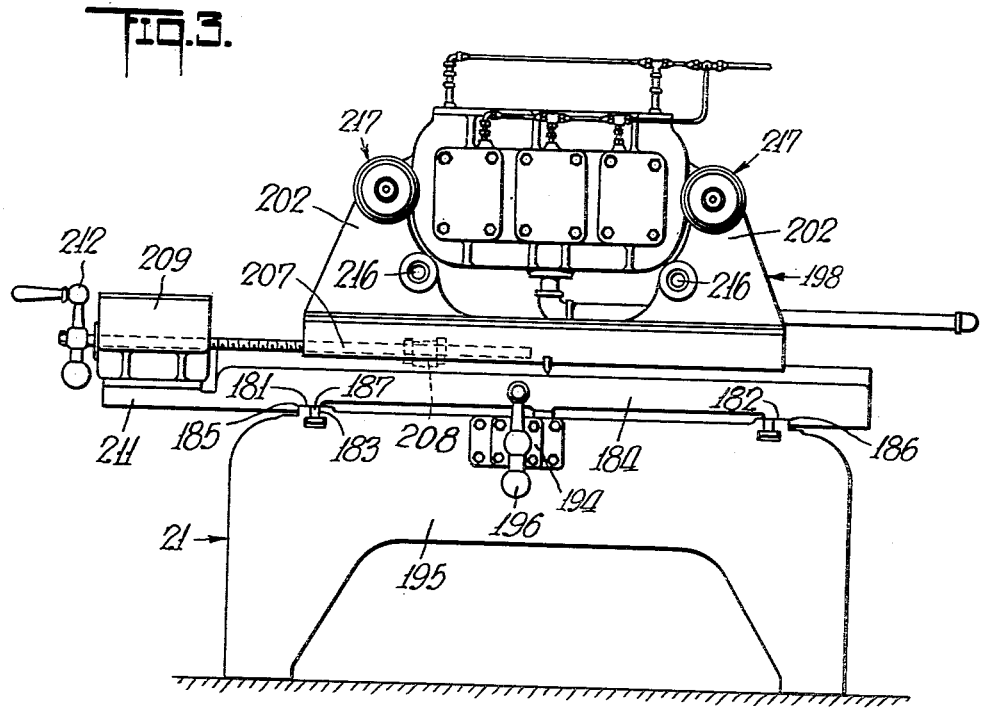
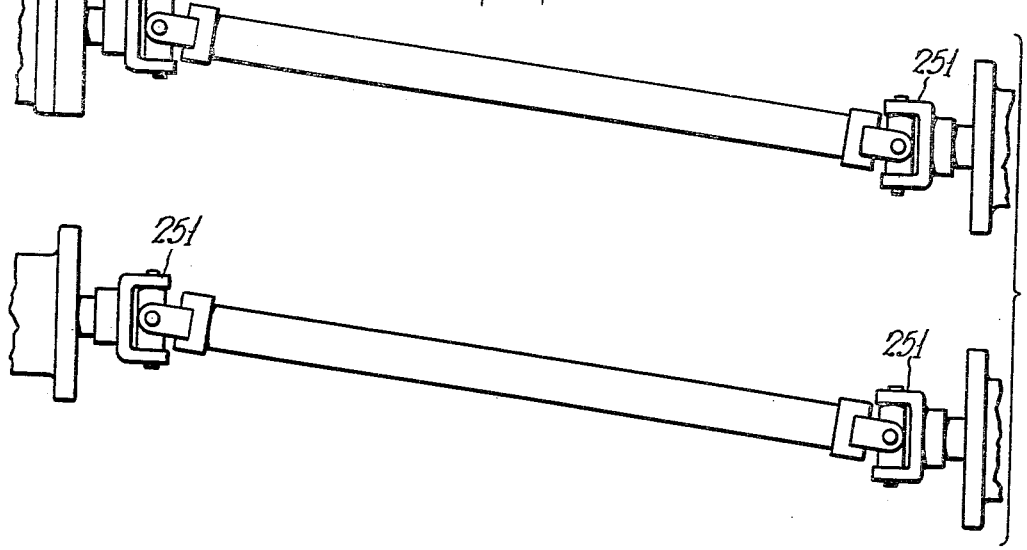

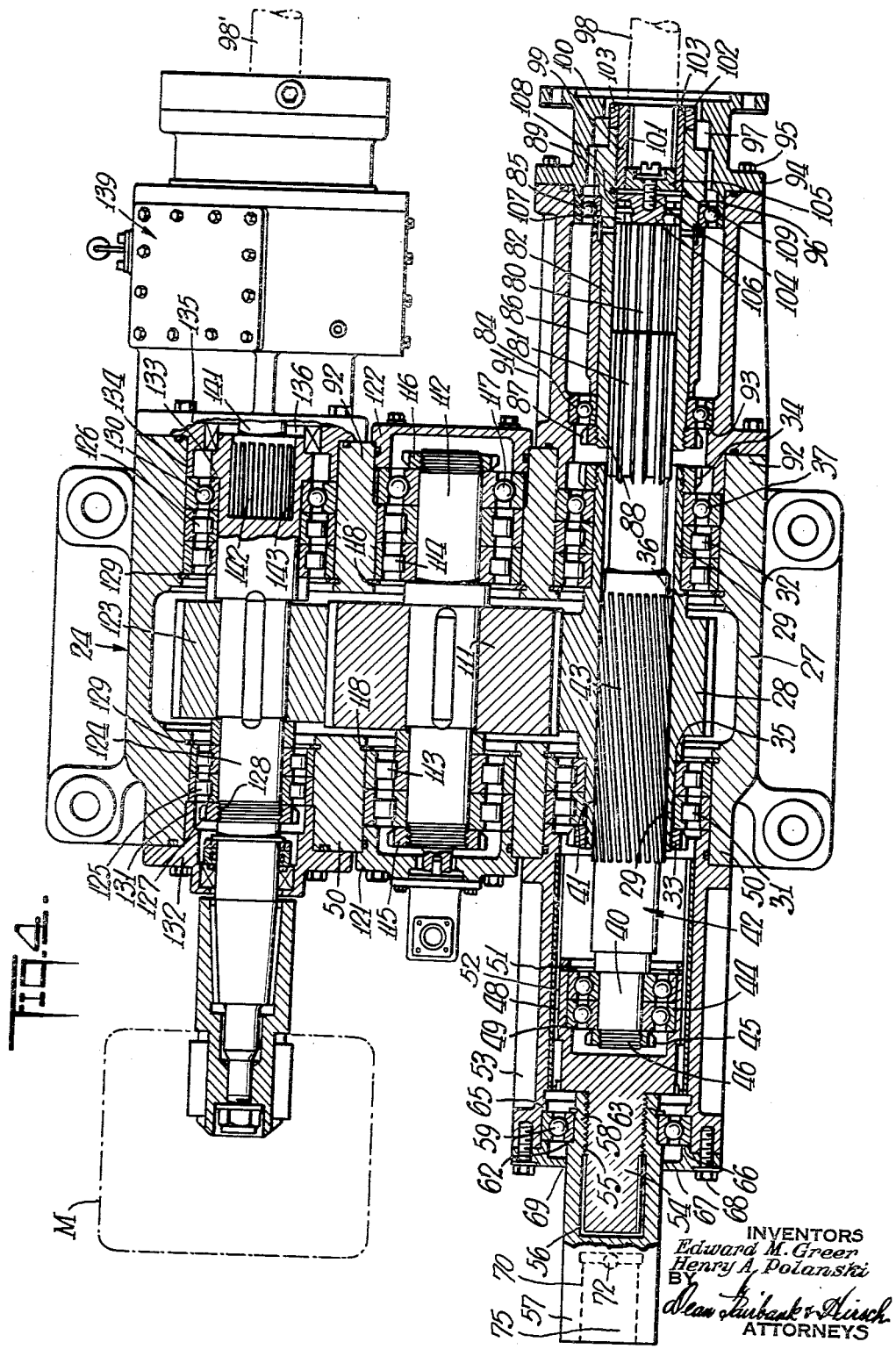

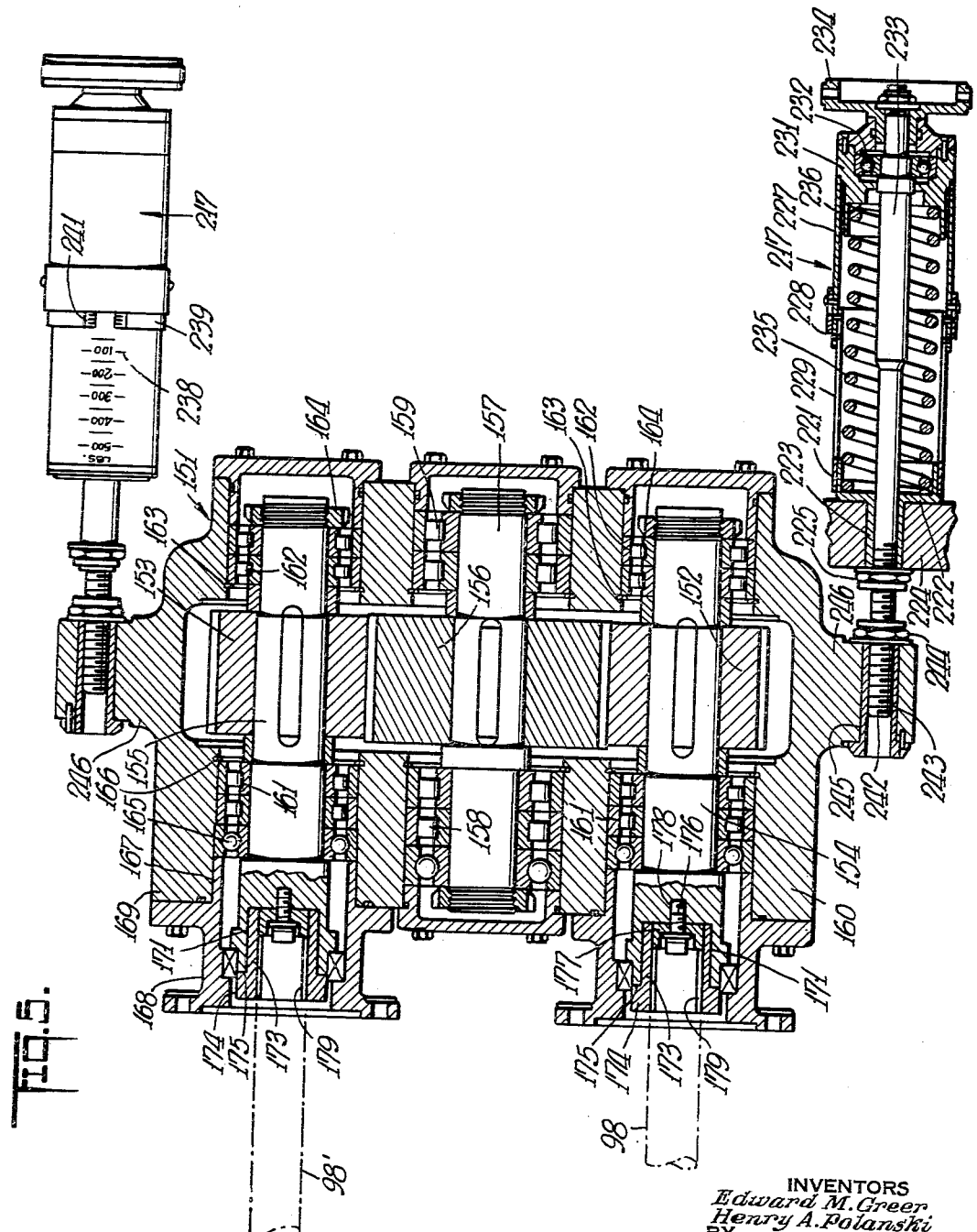

United States Patent Office 2,712,756
Patented July 12, 1955

2,712,756

STATIC AND DYNAMIC TESTING MACHINE

Edward M. Greer, West Hempstead, and Henry A. Polanski, New York, N. Y., assignors to Greer Hydraulics, Inc., Brooklyn, N. Y., a corporation of New York Application May 29, 1951, Serial No. 228,886

16 Claims. (Cl. 73—99)

This invention relates to testing equipment, more particularly of the type for applying torque to rotatable members such as shafts or the like for testing purposes.

It is among the objects of the invention to provide an equipment whereby a predetermined torque may be applied to a rotatable member under both static and dynamic conditions, which equipment is relatively simple in construction and may readily be operated to give a direct indication of the torque applied to the rotatable member.

Another object is to provide equipment of the above type which may effect a speeding up and slowing down of the rotating member under test to apply sudden stresses on such member without need for varying the speed of the driving motor of the equipment.

Another object of the invention is to provide equipment of the above type whereby the accuracy of machining of the splines at the ends of rotatable shafts may be ascertained and directly indicated to the operator.

According to the invention the equipment desirably comprises a pair of gear units mounted on a suitable frame or bed between which, for example, a pair of shafts to be tested may be mounted, said equipment having associated therewith a torque meter to indicate the torque applied to the system. To apply such torque a longitudinally movable shaft is provided which may be displaced to any desired amount to effect rotation of suitable gear means which in turn rotate the shafts under test. One of said shafts is connected to said longitudinally movable shaft which is designed to apply torque in direction opposed to the direction of rotation of such shaft thereby applying torque to the system, the amount of torque depending upon the longitudinal displacement of said longitudinal movable shaft.

Through suitable drive means the shafts under test may be continuously rotated with such predetermined torque applied thereto. The equipment desirably includes means for imparting sudden applications of torque to the shafts under test and this is accomplished in the illustrative embodiment herein shown by displacing the shafts under test so they are out of longitudinal alignment with said gear units between which they are mounted and interposing universal joints between the ends of the shafts and the associated gear unit to produce such applications of sudden torque to the shafts upon rotation thereof.

The equipment also desirably has means to test the machining of the splines normally formed at the ends of the shafts whereby the latter may be operatively connected in the system in which they are to be used. For this purpose a thrust loading device is provided which will tend to pull a splined member away from the splined end of the shaft in engagement therewith. This thrust member is designed to indicate the amount of force required to effect such displacement.

In the accompanying drawings in which are shown one or more of various possible embodiments of the several features of the invention, Fig. 1 is a plan view of the equipment,
Fig. 2 is a side elevational view thereof,
Fig. 3 is an end view of the equipment,
Fig. 4 is a sectional view on a larger scale taken along line 4—4 of Fig. 2,
Fig. 5 is a view similar to Fig. 4 taken along line 5—5 of Fig. 2, and
Fig. 6 is a fragmentary view of the equipment set up to test the splines on the shafts.

Referring now to the drawings, the equipment desirably comprises a substantially rectangular bed 21 supported by means of legs 22 which may rest upon the floor. Mounted on the bed 21 near one end thereof and extending transversely thereacross is a table 23 on which is positioned a drive gear unit 24, the latter having flanges 25 secured to the table 23 as by bolts 26.

Rotatably mounted in the casing 27 of gear unit 24 as shown in Fig. 4, is a gear 28 which has an axial extension or sleeve 29 at each end journalled in suitable bearings 31 and 32, illustratively of the roller type, mounted in the casing 27. The bearings 31 and 32 are desirably restrained from axial displacement in the casing by means of nuts 33, 34 screwed on the threaded end of said sleeves 29, the bearings being clamped between said nuts and an associated annular shoulder 35, 36 on the sleeves 29. Desirably a ball bearing 37 is also provided adjacent nut 34 to take up any thrust that may be imparted to gear 28 and its sleeves 29.

Extending through an axial bore 41 in gear 28 and sleeves 29 is a torque applying shaft 42 which is helically splined as at 43 and engages the correspondingly splined portion of the bore of gear 28. The outer end 40 of shaft 42 is desirably of reduced diameter and is journalled in bearings 44 retained on said outer end 40 by means of a nut 45 screwed on the threaded end 46 thereof.

The bearings 44 are desirably mounted in a cup shaped thrust member or socket 48 and retained against annular shoulder 49 therein as by a split type snap ring 51 coacting with the outer races of bearings 44. The socket 48 is desirably keyed as at 52 in a sleeve 53 affixed at one end to the wall 50 of the gear casing 27 and extending outward therefrom at right angles thereto. With this construction the socket 48 may be moved longitudinally of the sleeve but is restrained from rotary movement therein.

Means are desirably provided to impart longitudinal movement to the socket 48 and the torque applying shaft 42 journalled therein. To this end, the socket 48 desirably has an axial stud 54 which is externally threaded as at 55 and screwed into a threaded socket 56 at the end of a shaft 57. The shaft 57 is journalled at the socket end 58 in a bearing 59, desirably of the ball type, retained against an annular shoulder 62 on the end 58 of shaft 57 as by a split type ring 63 encompassing shaft 57. To prevent axial displacement of bearing 59 and shaft 57, the outer race of said bearing 59 is desirably seated against an annular shoulder 65 in sleeve 53 and retained thereagainst by the annular flange 66 of a closure plate 67 affixed to the end of sleeve 53 as by screws 68 and having an opening 69 therein through which shaft 57 extends.

Although the shaft 57 may be rotated in any suitable manner, in the illustrative embodiment herein shown, the shaft 57 has a socket 70 therein in which is affixed by pin 72, the end of a drive shaft 75 which extends from a transmission box 71 (Figs. 1 and 2) mounted on a bracket 72 affixed to the bed at one end thereof. The mechanism (not shown) in transmission box 71 is actuated by a crank handle 73 which is connected by a shaft 74 to the transmission box.

The inner end 81 of shaft 42 (Fig. 4) desirably has longitudinal splines therein which coact with corresponding longitudinal splines 80 in a sleeve 82 encompassing the end of said shaft 42 so that the latter may move axially of sleeve 82 and will rotate therewith. Sleeve 82 is desirably journalled at each end in bearings 84 and 85, desirably of the ball type and having a spacer bushing 86 therebetween, the bearings being retained on said sleeve by means of a nut 87 screwed on the threaded end 88 of the sleeve and urging the bearings 84, 85 and spacer bushing 86 toward annular shoulder 89 near the other end of the sleeve so that bearing 85 abuts thereagainst.

The sleeve 82 and its encompassing bearings 84 and 85 are desirably mounted in a sleeve 91 affixed at one end to the wall 92 of the gear casing 27 and extending outward therefrom at right angles thereto, sleeve 91 being axially aligned with sleeve 53. The sleeve 91 desirably has an annular shoulder 93 near its affixed end and the bearing 84 is retained against such shoulder by means of a closure plate 94 affixed to the outer end of sleeve 91 as by screws 95 and having an annular flange 96 abutting against bearing 85 and urging the latter, the bushing 86 and bearing 84, toward said shoulder 93, the end of sleeve 82 extending through seal 97 in said closure plate 94.

In order that the shaft 98 under test may be connected to sleeve 82, an adapter 99 is mounted in the outer end 100 thereof. As shown in Fig. 4 the adapter is desirably a sleeve having longitudinal splines 101 therein which may be engaged by the correspondingly splined end of the shaft 98 under test. The adaptor sleeve desirably has a plurality of laterally extending lugs 102 at the outer end thereof which are seated respectively in corresponding notches 103 in the end of sleeve 82 so that sleeve 82 and adaptor sleeve 99 may rotate in unison.

In order to prevent axial displacement of adaptor sleeve 99, a screw 104, which passes through an axial opening in a plug 105 affixed in the inner end of sleeve 99, is screwed into a threaded opening in a retaining member 106 also mounted in sleeve 82. As shown in Fig. 4, retaining member 106 desirably comprises a fitting having radially extending lugs 107 on the inner face thereof which coact with the splines 80 in sleeve 82 to key the fitting to the sleeve. Fitting 106 is desirably encompassed by a seal ring 108 and abuts at its periphery against a lock ring 109 desirably of the split type positioned in sleeve 82. Thus, when screw 104 is tightened the fitting 106 and the sleeve 99 will both be clamped against the lock ring 109 dependably to retain the sleeve 99 in position.

Gear 28 is in mesh with a gear 111 affixed on a stud shaft 112 extending parallel to shaft 42 and journalled in bearings 113 and 114, illustratively of the roller type, mounted in said casing 27. The bearings are retained on the shaft 112 by means of nuts 115 and 116 screwed on the threaded ends of the shaft, a ball bearing 117 being desirably mounted on shaft 112 adjacent nut 116 to take up thrust. To prevent axial displacement of the bearings in the casing, a pair of locking members 118, illustratively of the split ring type, is mounted in the casing associated respectively with each of the bearings 113 and 114, said bearings being retained against the associated locking member by means of closure plates 121 and 122 affixed to the casing on each side thereof.

Gear 111 meshes with a gear 123 affixed on a drive shaft 124 driven by means of a motor M. Shaft 124 extends parallel to shafts 112 and 42 and is journalled on each side of gear 123 in bearings 125 and 126 mounted in the casing. As shown in Fig. 4 the bearings 125 are retained on shaft 124 by means of a nut 127 screwed on the threaded end 128 thereof. The bearings are urged against the associated locking members 129 mounted in the casing, by means of the cylindrical rim 131 of a closure plate 132 affixed to wall 50 of the casing and through which shaft 124 extends. The bearing 126, which has a thrust bearing 130 associated therewith is retained on said shaft 124 between locking member 129 and shoulder 133 thereon, by means of the rim 134 of a closure plate 135 affixed to wall 92 of the casing.

Mounted on the wall 92 of the casing and extending outwardly therefrom is a torque indicating device 139 illustratively of the type put out by Baldwin Locomotive Company. As such device is substantially conventional in construction, it will not be described. The indicating device 139 desirably has an actuating shaft 141, the longitudinally splined end 142 of which extends through opening 136 in closure plate 135 into a socket 143 in the end of drive shaft 124, the socket also being longitudinally splined to coact with end 142.

Associated with the drive gear unit 24 and mounted on the bed 21 at its other end, is a transfer gear unit 151 (Fig. 5). The transfer gear unit 151 is substantially the same construction as the drive gear unit 24 and desirably comprises a pair of identical gears 152 and 153, each mounted on a stud shaft 154 and 155 respectively and affixed thereto so as to rotate therewith, the gears 152 and 153 each meshing with a gear 156 mounted on a stud shaft 157 extending parallel to shafts 154 and 155 and journalled at its ends in bearings 158 and 159 mounted in the casing 160 of gear unit 151.

Each of the shafts 154 and 155 is journalled in bearings 161 and 162 desirably of the roller type positioned on each side of the associated gear, said bearing 162 desirably being retained against a locking member 163 affixed in the casing 160 as by means of a nut 164 screwed on the associated shaft. The bearing 161 desirably has a ball bearing 165 associated therewith to take up the thrust and the bearings 161 and 165 are retained against locking member 166 by means of annular projection 167 on a flanged collar 168 affixed to the wall 169 of the gear unit 151.

The shafts 154 and 155 each have a socket 171 in the end thereof aligned with an axial opening in the associated collar 168. Positioned in said socket is an adapter, illustratively a sleeve 173, having lateral lugs 174 at the outer end thereof which seat in corresponding notches 175 in the outer end of sockets 171. Each of the sleeves 173 is retained in the associated socket by means of a screw 176 which extends through the bore of a plug 177 affixed in the inner end of the sleeve 173 and screwed into the associated shaft as at 178. The sleeves are each desirably longitudinally splined as at 179 to engage the correspondingly splined ends of the shaft 98, 98' under test.

Means are desirably provided to afford longitudinal and transverse displacement of the transfer unit 151 on the bed 21 so that shafts of different lengths may be tested under conditions of static, dynamic and impact torque and also to permit tests to be made of the splines on the shaft.

To this end, as shown in Figs. 1 and 3 the bed 21 desirably has a pair of spaced parallel ribs 181 and 182 thereon extending longitudinally thereof adjacent the edges of the bed, each of said ribs having a longitudinal slot 183 therein substantially T-shaped in cross section. Slidably mounted on said ribs is a table 184 which extends transversely across the bed and rides on said ribs, said table desirably having shoulders 185 and 186 which straddle the ribs 181, 182 to guide the table therealong. Desirably a plurality of bolts 187 have their heads positioned in each of said T-shaped slots 187 and extend upwardly through the table, being secured by means of nuts 188 to retain the table on the bed, yet free to slide therealong.

Although the table may be moved longitudinally on the bed in any desired manner, in the embodiment herein shown, a shaft 191 (Figs. 1, 2 and 3) is threaded along its length and extends longitudinally of the bed substantially midway between the side edges thereof. The shaft 191 which desirably extends beneath the bed 21 is journalled at its inner end 192 in a bearing block 193 affixed to the bed and extends at its other end through a bearing block 194 affixed to the end wall 195 of the bed 21, a crank handle 196 being mounted on said end to facilitate rotation of the shaft. The shaft desirably is threaded through a correspondingly threaded bushing 197 affixed to the underside of the table 184 and movable in an elongated slot in the bed 21, so that upon rotation of the handle 196 and shaft 191 the table 184 will move longitudinally along the bed.

In order to afford transverse movement of the transfer gear unit 151, a cradle 198 is provided which supports such unit in the manner hereinafter to be described. The cradle 198, as shown in Figs. 1, 2, and 3 desirably comprises a substantially rectangular base 199 with a pair of spaced parallel upstanding arms 201 and 202 at each end thereof preferably formed integral therewith. The base 199 of the cradle 198 desirably rests on a pair of spaced parallel ribs 203 and 204 on the upper surface of table 184 and extending transversely of the bed 21. The cradle is retained on the ribs by means of bolts 205 which extend through longitudinal slots 206 on each side of the base of the cradle and are screwed into said ribs 203, 204, said slots 206 limiting the transverse movement of said cradle.

Although the cradle could be moved in any suitable manner, in the preferred embodiment herein shown, a threaded shaft 207 (Fig. 3) extends transversely of the bed 21 and is screwed into a threaded bushing 208 rigid with the cradle. The outer end of the shaft 207 desirably extends into a transmission box 209 mounted on the end 211 of table 184 and said shaft 207 is actuated by means of a crank handle 212. Thus upon rotation of said crank handle the cradle may be moved transversely with respect to the bed 21 as desired.

The casing of the transfer gear unit 151 is desirably positioned on the cradle so as to be movable relative thereto longitudinally of the bed 21. To this end the gear unit 151 desirably has an elongated bushing 215 on each side thereof through which extends a rod 216 affixed at each end in the associated pairs of upstanding arms 201 and 202. As shown, the bushings are of length considerably less than the space between each pair of arms 201, 202 to afford freedom of movement of the gear unit 151.

Associated with the transfer gear unit 151 are a pair of thrust loading devices 217 mounted respectively on the arms 202 of the mount, and which serve to provide thrust on the shafts under test, thereby to test the splines on the ends of the shaft in the manner hereinafter to be described.

As shown in Fig. 5 the thrust loading devices 217, which are identical, each desirably comprises a substantially cylindrical casing 221 having a wall 222 at one end with an axial sleeve 223 preferably formed integral therewith. The sleeve 223 extends through the bore of a hub 224 on the arms 202 and by means of a nut 225 screwed on the threaded end of the sleeve, which projects beyond the hub 224, the casing 221 is securely clamped thereto.

Telescoped on said casing 221 is a second substantially cylindrical casing 227 which desirably has radially inward extending pins 228 on each side thereof which extend into longitudinal slots 229 in the casing 221 to key said outer casing 227 to said inner casing 221. Affixed in the outer end of casing 227 is a plug 231 having a bearing 232 therein in which is journalled a shaft 233, the latter extending longitudinally of the casings 221, 227 through the plug 231 and through the sleeve 223 and having a knob 234 at the outer end thereof.

Positioned in said casings is a coil spring 235 compressed between the end wall 222 of casing 221 and the floor of a socket 236 preferably formed integral with the plug 231. Desirably the casing 221 has scale markings 238 on the outer surface thereof extending longitudinally of its length and the end 239 of the casing 227 has pointer indications 241 thereon.

As shown in Fig. 5, the end 242 of shaft 233 is threaded and is screwed into a correspondingly threaded bushing 243 affixed as by means of a nut 244 in a bore 245 in lateral ears 246 on each side of the gear unit 151.

*Operation*

In the operation of the unit, as for example, to test a pair of shafts 98, 98', the table 184 mounting the transfer gear unit 151 is displaced to the right (Fig. 2) by means of the rotation of crank handle 196 until it has been moved a sufficient distance from drive gear unit 24 to permit the splined ends of shafts 98 and 98' to be aligned with the axially aligned internally splined adapters on shafts 42 and 154 and the torque meter 139 and shaft 155. The operator may then rotate the handle 196 in the opposite direction which will cause the table 184 to move to the left so that the splined end of the shafts will be retained in the associated adapters.

To apply static torque to the shafts 98, 98' under test, the crank handle 73 (Fig. 2) is rotated by the operator to rotate the shaft 57 through the gear transmission 71. As shaft 57 (Fig. 4) rotates in its bearings 59, the threaded stud 54 of socket 48 will be moved, for example, inwardly into sleeve 53 to advance the socket therein, the latter being restrained from rotation by the keyway 52. Such inward movement of the socket 48 will cause the torque applying shaft 42 to move inwardly, i. e., to the right as the shoulder 49 of the socket 48 will abut against bearings 44.

The inward movement of the torque applying shaft 42 above described, will cause the splined portion 43 thereof to effect rotation of gear 28. Such rotation may, for example, depending upon the design of the helical splines 43 be in a counterclockwise direction, the shaft 42 tending to rotate in a clockwise direction as is well understood, but being restrained by the coacting longitudinal splines 81 and 80 on the end of shaft 42 and in sleeve 82, as such sleeve 82 is restrained by the end of the shaft 98 connected thereto. The rotation of gear 28 in a counterclockwise direction will cause the gear 111 in mesh therewith to rotate in a clockwise direction, thereby causing gear 123 which also is in mesh with gear 111 to rotate in a counterclockwise direction.

As a result of the rotation of gear 123 and its associated shaft 124, the shaft 141 of the torque meter 139 connected thereto will be rotated as will be the mechanism of such torque meter and the adapter (not shown) at the end thereof. Consequently, the shaft 98' under test, which is connected to the adapter of the torque meter 139 will rotate in a counterclockwise direction as will the shaft 155 in transfer gear unit 151 (Fig. 5) which is connected to the adjacent splined end of shaft 98' by means of adapter 173. Rotation of shaft 155 in a counterclockwise direction will cause the gear 153 thereon to rotate similarly, thereby rotating the gear 156 meshing therewith in a clockwise direction. This will effect counterclockwise rotation of gear 152 in mesh with gear 156 so that shaft 154 and its adapter 173 will also rotate in such counterclockwise direction. As a result, the shaft 98 under test, which is connected to adapter 173, will also rotate in a counterclockwise direction and such rotary motion will be applied through adapter 99 to sleeve 82.

It is apparent that sleeve 82 will have two forces applied thereto in opposite directions, i. e., the clockwise motion of torque applying shaft 42 and the counterclockwise motion of shaft 98. As a result a torque will be created in the system, the amount of such torque depending upon the length of longitudinal movement of the shaft 42 and such torque can be read directly on a suitable scale (not shown) on the torque meter, in, for example, foot-pounds. As the operation of such torque meter is well known, it will not be described.

The test thus far made is a static torque test and the shafts under test may be marked near each end with longitudinally aligned indications so that when the shafts are removed from the equipment and such marks are viewed, if they have become out of alignment after a predetermined amount of torque has been applied thereto, it will indicate that the applied torque exceeds the maximum that can be applied to the shaft without distortion thereof.

If it is desired to apply a dynamic torque test to the shafts, it is merely necessary to energize the motor M to rotate the shaft 124. As a result, through the system above described, the shafts 98 and 98′ will rotate inasmuch as the torque applying shaft 42 is free to rotate in its bearings 44, 31, 32 and 37 and the sleeve 82 is free to rotate in its bearings 84, 85. As a result, the shafts 98 and 98′ may be rotated for a predetermined length of time with any desired amount of torque applied thereto and the shafts may then be removed from the system and observed to see if the markings thereon are out of line.

The equipment is also designed to determine the accuracy of the machining of the splines at the ends of the shafts 98 and 98′. If there should be irregular, raised or rough portions on the faces of such splines which coact with the corresponding splines in the respective adapters, the entire strain will be applied to such raised portions rather than being distributed along the entire length of the splines. As a result, by reason of such concentration of stress, the splines are likely to break.

To test the accuracy of the splines with the shafts assembled in the associated adapters and extending longitudinally of the bed, the operator first energizes the motor M to rotate the shaft 98 and 98′ under test. The knobs 234 on each of the thrust loading devices 217 are thereupon rotated which will move the threaded end 242 of shaft 233 into the associated bushing 245 so that the casing 227 of the thrust loading device will move forwardly on casing 221 against the tension of compressed coil spring 235. The amount of movement of the casing 227 is translated into a suitable indication which may be, for example, in pounds of thrust and this is indicated by the markings 238 on the fixed casing 221 with which the pointer 241 on the casing 227 coacts. As there will be considerable friction between the splines at the ends of the shafts 98 and 98′ and the splines in the associated adapters when the shafts 98 and 98′ are rotated, the tendency of the gear unit 151 to move to the right by reason of the coacting screw threads on shaft 233 and in bushing 245 when shaft 233 is rotated, will initially be overcome.

When, however, sufficient rotation of shaft 233 is accomplished with resultant compression of coil spring 235 to overcome such friction, further rotation of shaft 233 will cause the gear unit 151 to move to the right. Consequently, the casing 227 will move no further along the casing 221 and there will be no further compression of the coil spring 235. The operator can then note the reading on the casing 221 at which, even with additional rotation of the knob 234, the friction of the coacting splines will be overcome.

It is, of course, understood that certain basic permissible limits of friction may be determined beyond which the splines will be considered unfit and the above test of the accuracy of the splines can, of course, be made with or without torque being applied to the system by the rotation of handle 73.

The machine is also designed to test the shafts under conditions when the torque applied thereto is not constant but is intermittent, i. e., becomes greater and less as the shafts rotate. For this purpose a plurality of universal joints 251 (Fig. 6) are utilized, connected respectively to each end of the shafts under test, and to the associated adapter. The transfer gear unit 151 may then be displaced either to the left or to the right as desired, by merely rotating the crank handle 212, which will cause the table 184 to slide along ribs 203, 204 in the desired direction limited by the abutment of bolts 205 against the ends of slots 206. As a result of such movement, shafts 98 and 98′ will no longer extend longitudinally of the bed 21, but will extend at an oblique angle with respect thereto, the gear transmission 209 desirably having an indicator (not shown) to indicate the amount of displacement of the shaft.

With the shafts 98 and 98′ thus mounted and a given torque applied to the system, the motor M may be energized. As is well known, a universal joint does not transmit a constant velocity ratio to its driven shaft when the shaft extends other than longitudinally of the joint. That is, if the joint turns at a constant speed the driven shaft undergoes a speeding up and slowing down period each revolution. As a result during each slowing down period there will be a releasing or reduction of the torque and at the speeding up period the applied torque will be suddenly impressed to the system and hence to the shafts under test. After the shafts have rotated a predetermined length of time, they may be removed from the equipment for inspection as previously described.

The equipment above described is useful for simultaneously performing a plurality of tests on a pair of shafts and dispenses with the need for utilizing testing equipment of many types to perform such multiplicity of tests. In addition, the equipment permits combined tests such as dynamic torque and spline tests to be made simultaneously.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. Apparatus of the character described for testing rotatable equipment, said apparatus comprising a pair of spaced normally longitudinally aligned gear units adapted to carry therebetween the equipment under test, one of said units having an axially movable shaft, a gear mounted on said shaft, coacting means on said gear and said shaft tending to effect rotary movement of said gear and said shaft in opposed directions upon axial movement of said shaft, a transmission from said gear to the equipment under test to rotate said equipment upon rotation of said gear by said shaft, means operatively to connect the equipment under test to said shaft to restrain the latter from rotation with respect to the porion of such equipment under test connected thereto yet to permit axial movement thereof, whereby upon axial movement of said shaft torsion will be applied to the equipment under test.

2. The combination set forth in claim 1 in which means are provided to measure the amount of torsion applied to the equipment under test.

3. The combination set forth in claim 1 in which said shaft and said means operatively connecting the equipment under test thereto are rotatably mounted in the associated gear unit and drive means is provided to rotate said equipment under test independently of the rotation thereof by said shaft.

4. The combination set forth in claim 3 in which means are provided to effect transverse displacement of one of said gear units with respect to the other and universal joints connect the equipment under test to said gear units whereby upon rotation of said equipment under test by said drive means torsion will be intermittently applied to said equipment under test.

5. Apparatus of the character described to test the splines of rotatable equipment, said apparatus comprising a pair of spaced normally longitudinally aligned gear units to carry therebetween the equipment under test, said gear units having splines to coact with the splines of the equipment under test, drive means operatively connected to one of said gear units to rotate such equipment under test, means slidably mounting one of said gear units so that it is longitudinally displaceable with respect to the other, adjustable means to effect such longitudinal displacement of said gear unit and means to indicate the amount of force required to effect such displacement when said equipment under test is rotating.

6. Apparatus of the character described to test the splines of rotatable equipment, said apparatus comprising a pair of spaced normally longitudinally aligned gear units adapted to carry therebetween the equipment under test, said gear units having splines to coact with the splines of the equipment under test, one of said gear units having an axially movable shaft, a gear mounted on said shaft, coacting means on said gear and said shaft tending to effect rotary movement of said gear and said shaft in opposed directions upon axial movement of the latter, a transmission from said gear to the equipment under test to rotate the latter upon rotation of said gear by said shaft, means operatively to connect the equipment under test to said shaft to restrain the shaft from rotation with respect to the portion of such equipment under test connected thereto yet to permit axial movement of said shaft, whereby upon axial movement of said shaft, torsion will be applied to the equipment under test, means rotatably mounting said shaft and the means operatively connecting the equipment under test thereto, drive means to rotate such equipment independently of the rotation thereof by said shaft, means slidably mounting one of said gear units so that it is longitudinally displaceable with respect to the other, adjustable means to effect said longitudinal displacement of said gear unit and means to indicate the amount of force required to effect such displacement when such equipment is rotating.

7. Apparatus of the character described to test the splines of rotatable equipment, said apparatus comprising a pair of spaced normally longitudinally aligned gear units adapted to carry therebetween the equipment under test, said gear units having splines to coact with the splines of the equipment under test, one of said gear units having an axially movable shaft, a gear mounted on said shaft, coacting means on said gear and said shaft tending to effect rotary movement of said gear and said shaft in opposed directions upon axial movement of the shaft, a transmission from said gear to the equipment under test to rotate the latter upon rotation of said gear by said shaft, means operatively to connect the equipment under test to said shaft to restrain the latter from rotation with respect to the portion of such equipment under test connected thereto yet to permit axial movement thereof, whereby upon axial movement of said shaft, torsion will be applied to the equipment under test, means rotatably mounting said shaft and the means operatively connecting the equipment under test thereto, drive means to rotate such equipment under test independently of the rotation thereof by said shaft, means slidably mounting one of said gear units so that it is displaceable transversely with respect to the other, universal joints to connect the equipment under test to said gear units whereby upon rotation of such equipment under test by said drive means torsion will be intermittently applied to such equipment under test.

8. The combination set forth in claim 5 in which said gear units are mounted on a bed, a table is slidably mounted on said bed and movable longitudinally thereof, a cradle is slidably mounted on said table and movable transversely thereof, said cradle having a pair of spaced upstanding arms near each end thereof, each of said pair of arms having a connecting rod, one of said gear units has a bushing on each side therethrough which said rods extend respectively, slidably to mount said gear unit and adjustable means associated with said gear unit longitudinally to displace the latter, and the adjustable means to effect longitudinal displacement of said gear unit has the indicating means to register the amount of force required to effect such displacement when the equipment under test is rotating.

9. The combination set forth in claim 8 in which said adjustable means comprises a thrust loading device affixed to one of the arms of said cradle and having a rotatable shaft, threaded at one end and screwed into a corresponding threaded opening in said transfer gear unit, said loading device having resilient means coacting with said shaft normally to urge the latter away from said transfer gear unit, whereby upon rotation of said shaft when such equipment is rotating, the threaded end thereof will screw into said gear unit and said resilient means will be compressed, said indicating means registering the amount of compression of said spring.

10. Apparatus of the character described for testing rotatable equipment, said apparatus comprising a drive gear unit, a transfer gear unit spaced from said drive gear unit and normally longitudinally aligned therewith, said units being adapted to carry therebetween the equipment under test, one of said units having an axially movable torque applying shaft having a helical spline conformation thereon, a gear having a bore through which said shaft extends and having a conformation in said bore coacting with said helical spline whereby upon axial movement of said shaft, said gear and said shaft will tend to rotate in opposite directions, said shaft having longitudinal splines on one end thereof, a sleeve encompassing said shaft and having internal longitudinal splines coacting with the splined end of said shaft, to restrain said shaft from rotation with respect to said sleeve, a transmission from said gear to the equipment under test to rotate said equipment upon rotation of said gear by said shaft, and means operatively to connect the equipment under test to said sleeve, whereby upon axial movement of said shaft, torsion will be applied to the equipment under test.

11. The combination set forth in claim 10 in which an axially movable socket is provided, means to restrain said socket from rotation, said socket having a bearing therein rotatably mounting the other end of said shaft, bearing means are provided rotatably to mount said sleeve and means are provided axially to move said socket thereby axially to move said shaft.

12. The combination set forth in claim 10 in which a cup shaped thrust member is provided having an externally threaded axial stud on one side and a socket on the other, said thrust member being axially movable but restrained from rotation, a shaft is provided rotatably mounted at one end and having an internally threaded socket therein in which is screwed said threaded stud, said socket in said thrust member having a bearing therein rotatably mounting the other end of said torque applying shaft, bearing means are provided rotatably to mount said sleeve whereby upon rotation of said shaft said thrust member will be axially moved thereby axially to move said torque applying shaft into said sleeve and to rotate said gear.

13. Apparatus of the character described for testing rotatable equipment, said apparatus comprising a drive gear unit, a transfer gear unit spaced from said drive gear unit and normally longitudinally aligned therewith, one of said gear units having an axially movable torque applying shaft having a helical spline conformation thereon, a gear having a bore through which said torque applying shaft extends and having a conformation in said bore coacting with said helical spline whereby upon axial movement of said shaft, said gear and said shaft will tend to rotate in opposite directions, said shaft having longitudinal splines on each end thereof, a torsion sleeve encompassing said shaft and having internal longitudinal splines coacting with the splined end of said shaft to restrain the latter from rotation with respect to said sleeve, means rotatably mounting said shaft and said sleeve, said drive gear unit having a second gear, and a pinion in mesh with said first and second gear so that upon rotation of said first gear said second gear will rotate in the same direction, said transfer gear unit also having a first and second gear and a pinion in mesh therewith so that said gears will rotate in the same direction, means operatively to connect equipment under test to the sleeve of said drive unit and the first gear of said transfer unit and to the second gear of each of said units respectively so that upon rotation of said first gear of said drive unit the equipment under test will rotate, said sleeve restraining the rotation of the end of the equipment under test connected thereto to apply torque to the equipment under test.

14. The combination set forth in claim 13 in which the equipment under test is of the type having a longitudinally splined connecting end and the means to connect said equipment to said sleeve comprises an adapter sleeve positioned in said torsion sleeve and having internal longitudinal splines coacting with the splines on such equipment under test, said torsion sleeve and said adapter having complementary notches and lateral lugs which coact to key said sleeves together, a fitting in said sleeve having splines coacting with the splines in said torsion sleeve to key the fitting and the torsion sleeve together, means to retain said fitting in said torsion sleeve and prevent axial displacement thereof and means clamping said fitting and said adapter sleeve together to prevent axial displacement of said adapter sleeve.

15. The combination set forth in claim 13 in which said second gear in said drive gear unit is affixed on a shaft, and drive means are operatively connected to said shaft continuously to rotate the latter independently of the rotation thereof by said torque applying shaft thereby continuously to rotate the equipment under test with torsion applied thereto.

16. Apparatus of the character described for testing the splines of rotatable equipment, said apparatus comprising a bed, a pair of spaced longitudinally aligned gear units on said bed to carry the equipment under test, at least one of said gear units having splines to coact with the splines of the equipment under test, drive means to rotate such equipment under test, means to effect longitudinal movement of said last named gear unit with respect to the other, said means comprising a pair of telescoped substantially tubular casings, one of said casings being fixed so that the gear unit is movable with respect thereto and the other casing being longitudinally movable on said fixed casing, a coil spring in said casings compressed between the respective ends thereof, a rotatable shaft extending axially through said casings, and having a threaded end screwed into a correspondingly threaded bushing in said gear unit, whereby upon rotation of said shaft when said equipment is rotating, said spring will initially be compressed by the movement of the threaded end of said shaft into said bushing, said casings having indicating means associated therewith to indicate the amount of compression of said spring.

References Cited in the file of this patent
UNITED STATES PATENTS

| | | |
|---|---|---|
| 2,157,903 | Lapsley | May 9, 1939 |
| 2,371,607 | Collins | Mar. 20, 1945 |
| 2,593,269 | Clifford et al. | Apr. 15, 1952 |